(12) United States Patent
Rothmuller et al.

(10) Patent No.: US 7,415,662 B2
(45) Date of Patent: Aug. 19, 2008

(54) DIGITAL MEDIA MANAGEMENT APPARATUS AND METHODS

(75) Inventors: Kenneth Rothmuller, Santa Rosa, CA (US); Laurie Vertelney, Palo Alto, CA (US); Bernard L. Peuto, San Francisco, CA (US); Michael Slater, Sebastopol, CA (US)

(73) Assignee: Adobe Systems Incorporated, San Jose, CA (US)

( * ) Notice: Subject to any disclaimer, the term of this patent is extended or adjusted under 35 U.S.C. 154(b) by 536 days.

(21) Appl. No.: 10/198,618

(22) Filed: Jul. 17, 2002

(65) Prior Publication Data

US 2003/0033296 A1 Feb. 13, 2003

Related U.S. Application Data

(60) Provisional application No. 60/334,516, filed on Oct. 31, 2001.

(51) Int. Cl.
- G06F 17/00 (2006.01)
- G06F 17/20 (2006.01)
- G06F 17/30 (2006.01)
- G06F 7/00 (2006.01)

(52) U.S. Cl. .................... 715/200; 715/225; 707/3
(58) Field of Classification Search ............. 715/500, 715/530; 707/3
See application file for complete search history.

(56) References Cited

U.S. PATENT DOCUMENTS

| | | | |
|---|---|---|---|
| 5,241,671 A | | 8/1993 | Reed et al. |
| 5,491,626 A | * | 2/1996 | Williams et al. ............... 705/9 |
| 5,557,747 A | | 9/1996 | Rogers et al. |
| 5,644,766 A | | 7/1997 | Coy et al. |
| 5,668,966 A | * | 9/1997 | Ono et al. .................... 715/853 |
| 5,692,175 A | * | 11/1997 | Davies et al. ................. 707/3 |

(Continued)

FOREIGN PATENT DOCUMENTS

JP 08030763 2/1996

(Continued)

OTHER PUBLICATIONS

Smith, Brian K., et al., "Inquiry with Imagery: Historical Archive Retrieval with Digital Cameras", Multimedia '99, Orlando, Fl, Oct. 1999, pp. 405-408 [ACM 1-58113-151-8/99/0010].*

(Continued)

*Primary Examiner*—Cam-Y Truong
*Assistant Examiner*—Robert Stevens
(74) *Attorney, Agent, or Firm*—Fish & Richardson P.C.

(57) ABSTRACT

Methods and apparatus for managing, finding and displaying objects such as digital images. Objects are tagged ("associated") with descriptive textual and numeric data ("metadata"), and stored in a relational database from which they can be selected, sorted, and found. Tags can be defined by name, tag type, and associated attributes. Objects can be tagged by dropping a tag onto the object, or relating a database record for the tag to a database record for the object. Tagged objects can be searched for and displayed according to the degree to which their metadata matches the search criteria. Visual cues can indicate whether displayed objects match all, some but not all, or none of the search criteria. Database object distributions can be displayed as histograms or scatter plots, including timelines, calendars or maps. Object distributions can be used to search for objects or to limit search results for a previous search.

30 Claims, 6 Drawing Sheets

U.S. PATENT DOCUMENTS

| | | | |
|---|---|---|---|
| 5,706,457 A | 1/1998 | Dwyer et al. | |
| 5,734,888 A | 3/1998 | Li et al. | |
| 5,751,286 A * | 5/1998 | Barber et al. | 715/835 |
| 5,761,655 A * | 6/1998 | Hoffman | 707/4 |
| 5,787,412 A * | 7/1998 | Bosch et al. | 707/2 |
| 5,813,014 A * | 9/1998 | Gustman | 707/103 R |
| 5,832,495 A * | 11/1998 | Gustman | 707/102 |
| 5,842,218 A * | 11/1998 | Robinson | 707/102 |
| 5,844,572 A | 12/1998 | Schott | |
| 5,884,298 A * | 3/1999 | Smith et al. | 707/2 |
| 5,898,431 A | 4/1999 | Webster et al. | |
| 5,956,730 A | 9/1999 | Burroughs et al. | |
| 6,017,157 A | 1/2000 | Garfinkle et al. | |
| 6,085,205 A | 7/2000 | Peairs et al. | |
| 6,094,657 A * | 7/2000 | Hailpern et al. | 707/103 R |
| 6,148,260 A * | 11/2000 | Musk et al. | 701/200 |
| 6,148,354 A | 11/2000 | Ban et al. | |
| 6,202,061 B1 * | 3/2001 | Khosla et al. | 707/3 |
| 6,240,423 B1 * | 5/2001 | Hirata | 707/104.1 |
| 6,246,410 B1 * | 6/2001 | Bergeron et al. | 715/854 |
| 6,370,541 B1 | 4/2002 | Chou et al. | |
| 6,396,963 B2 * | 5/2002 | Shaffer et al. | 382/305 |
| 6,408,301 B1 | 6/2002 | Patton et al. | |
| 6,425,017 B1 | 7/2002 | Dievendorff et al. | |
| 6,434,546 B1 * | 8/2002 | Williamowski et al. | 707/3 |
| 6,466,940 B1 * | 10/2002 | Mills | 707/102 |
| 6,504,571 B1 * | 1/2003 | Narayanaswami et al. | 348/231.99 |
| 6,581,102 B1 | 6/2003 | Amini et al. | |
| 6,587,856 B1 * | 7/2003 | Srinivasan et al. | 707/102 |
| 6,598,046 B1 * | 7/2003 | Goldberg et al. | 707/5 |
| 6,628,899 B1 * | 9/2003 | Kito | 396/56 |
| 6,629,104 B1 * | 9/2003 | Parulski et al. | 707/102 |
| 6,738,155 B1 * | 5/2004 | Rosenlund et al. | 358/1.15 |
| 6,760,884 B1 * | 7/2004 | Vertelney et al. | 715/500.1 |
| 6,904,427 B1 * | 6/2005 | Hagiwara et al. | 707/3 |
| 6,947,959 B1 * | 9/2005 | Gill | 715/501.1 |
| 7,296,032 B1 | 11/2007 | Beddow | |
| 2002/0140820 A1 | 10/2002 | Borden, IV | |
| 2003/0084065 A1 | 5/2003 | Lin et al. | |
| 2005/0044066 A1 | 2/2005 | Hooper et al. | |
| 2005/0050043 A1 | 3/2005 | Pyhalammi et al. | |
| 2005/0182752 A1 | 8/2005 | Rojer | |
| 2005/0207645 A1 * | 9/2005 | Nishimura et al. | 382/170 |

OTHER PUBLICATIONS

Loui, Alexander C., et al., "A Software System for Automatic Albuming of Consumer Pictures", Multimedia '99 (Part 2), Orlando, Fl; Oct. 1999, pp. 159-162 [ACM 1-58113-239-5/99/0010].*
Cha, Guang-Ho, et al., "Object-Oriented Retrieval Mechanism for Semistructured Image Collections", Multimedia '98, Bristol, UK, Sep. 1998, pp. 323-332 [ACM 1-58113-036-8/98/0008] (plus citation page).*
Balabanović, Marko, et al., "Storytelling with Digital Photographs", CHI '2000, The Hague, Amersterdam, Apr. 1-6, 2000, CHI Letters, vol. 2 issue 1, pp. 564-571 [ACM 1-58113-036-8/98/0008].*
Bell, Gordon, "A Personal Digital Store", Communications of the ACM, vol. 44 No. 1, pp. 86-91.*
Mills, Timothy J., et al., "Managing Photos with AT&T Shoebox", SIGIR 2000, Athens, Greece, Jul. 2000, p. 390 [ACM 1-58113-226-3/00/0007] (plus citation page).*
Toyama, Kentaro, et al., "Geographic Location Tags on Digital Images", MM '03, Berkeley, CA, Nov. 2-8, 2003, pp. 156-166 [ACM 1-58113-722-2/03/0011].*
Kuchinsky, Allan, et al., "FotoFile: A Consumer Multimedia Organization and Retrieval System", CHI '99, Pittsburgh, PA, May 15-20, 1999, pp. 496-503.*
Ahlberg, Christopher, et al., "Visual Information Seeking Using the FilmFinder", CHI '94, Boston, MA, Apr. 1994, pp. 433 and 484 (2 pages).*
Christel, Michael, "Visual Digests for News Video Libraries", ACM Multimedia '99, Orlando, FL, Oct. 1999, pp. 303-311.*
North, Chris, et al., "Snap-Together Visualization: A User Interface for Coordinating Visualizations via Relational Schemata", AVI 2000, Palermo, Italy, May 2000, pp. 128-135.*
"Adobe Acquires Fotiva", Silicon Valley / San Jose Business Journal, Dec. 5, 2001, p. 1 (downloaded from: sanjose.bizjournals.com/sanjose/stories/2001/12/03/daily29.html?t=printable).*
"Adobe Acquires Technology to Create Complete Image Management and Sharing Solution", Adobe Press Release, Dec. 5, 2001, pp. 1-3 (downloaded from: www.adobe.com/aboutadobe/pressroom/pressreleases/200112/20011205fotiva.html).*
"Introducing Fotiva, Inc., NEA-Backed New Consumer Digital Software and Services Company; Led by Former Intuit SVP, Company Plans On Launching Mass-Appeal Digital Solutions", Business Wire, Oct. 8, 2001, pp. 1-2 (downloaded from: www.findarticles.com/p/articles/mi_m0EIN/is_2001_Oct_8/ai_78958587/print).*
Mills, Timothy J., et al., "Shoebox: A Digital Photo Management System", Technical Report 2000. 10, AT&T Laboratories Cambridge, (c) 2000, pp. 1-8.*
Hirata, Kyoji, et al., "Facilitating Object-Based Navigation Through Multimedia Databases", Theory and Practice of Object Systems, vol. 4, No. 4, © 1998, pp. 261-283.*
Hill, Linda L., et al., "Collection Metadata Solutions for Digital Library Applications", Journal of the American Society for Information Science, vol. 50, No. 13, © 1999, pp. 1169-1181.*
Li, Wen-Syan, et al., "Brokerage Architecture for Stock Photo Industry", RIDE 1997, Apr. 7-8, 1997, pp. 91-100.*
Mark Quinn: "PCT Invitation to Pay Additional Fees with Partial International Search Report", Sep. 19, 2002; PCT/US02/01530.
Shneiderman, Ben: "Designing the user interface: Strategies for effective human-computer interaction", 1959; Addison Wesley, USA XP 002210867; ISBN: 0-201-69497-2; Chapter 15: "Information Search and Visualization".
Christopher Ahlberg: "Spotfire: An Information Exploration Environment", Dec. 1, 1996; IVEE Development AB, Chalmers University of Technology & SSKKII, Sweden.
Beaza-Yates, R. and Ribeiro-Neto, B.: "Modern Information Retrieval"; Addison Wesley, USA XP002210866; ISBN: 0-201-39829-X; Chapter 10: "User Interfaces and Visualization".
Marti A. Hearst: "Next Generation Web Search: Setting our Sites"; Sep. 2000; Bulletin of the Technical Committee on Data Engineering, School of Information Management and Systems, University of California at Berkeley, CA.
Steven F. Roth, et al.: "Towards an Information Visualization Workspace: Combining Multiple Means of Expression"; 1997; Human-Computer Interaction Journal, vol. 12, No. 1-2, Lawrence Erlbaum Associates.
Goland, et al. "Simple Service Discovery Protocol/1.0 Operating Without an Arbiter", Oct. 28, 1999, published by the Internet Engineering Task Force (IETF), 17 sheets.
Christenssson, et al. "Universal Plug and Play Connects Smart Devices", as archived by the Wayback Machine™ on Oct. 23, 1999 pp. 1-22 (Note: the May 27, 2004 on the page refers to the date of the download, not the publication date).
Web page, http:///www.upnp.org as archived by the Wayback Machine™ on Oct. 23, 1999, 7 sheets.
"Read Me for iPhoto 2.0 for Mac OS X" [online], Jan. 30, 2003, Retrieved from Apple.Com Worldwide using Internet http://docs.info.apple.com/article.html?artnum=12188. pp. 1-3.
"Standard C++ Bible," Al Stevens and Clayton Walnum, IDG Books Worldwide, Inc. Copyright ©, 2000, pp. 324-327, 332-334, 353-354, 470-478, 589-598, 691-712.

* cited by examiner

|     | Sun | Mon | Tue | Wed | Thur | Fri | Sun |
| --- | --- | --- | --- | --- | --- | --- | --- |
|     | 27 | 28 | 29 | 30 | 31 | 1 | 2 |
|     | 3 | 4 | 5 | 6 | 7 | 8 ② | 9 |
|     | 10 | 11 | 12 | 13 | 14 | 15 Santa Rosa | 16 |
|     | 17 | 18 ① 3 of 10 | 19 | 20 | 21 | 22 | 23 |
|     | 24 | 25 | 26 | 27 | 28 | 29 | 30 |
|     | 1 | 2 | 3 | 4 | 5 | 6 | 7 |

◀ June ▶ ▲ 2001 ▶ ▲

June 18, 2001 3:45pm (Close Match)   < > ▲ ||   View

Cancel

Fig. 4

DIGITAL MEDIA MANAGEMENT APPARATUS AND METHODS

CROSS REFERENCE TO RELATED APPLICATIONS

This application claims the benefit of priority to U.S. application Ser. No. 10/052,213, filed Jan. 16, 2002 and now abandoned, which in turn claims the benefit of priority to U.S. application Ser. No. 09/774,523, filed Jan. 31, 2001 and now abandoned, which in turn claims priority to U.S. provisional application Ser. No. 60/261,897, filed Jan. 16, 2001 and U.S. provisional application Ser. No. 60/179,379, filed Jan. 31, 2000, the disclosures of which are incorporated by reference. This application also claims benefit of priority to U.S. provisional application 60/334,516 filed Oct. 31, 2001, the disclosure of which is incorporated by reference.

BACKGROUND

With the advent of digital photography and the world-wide-web, there has been an exponential growth in the creation and storage of digital photographic images. As the number of digital photographs taken and stored has grown, so too has the need for a convenient method of archiving, cataloguing, searching, and retrieving them. Modern methods of archiving and storing digital images typically require users to remember large amounts of information merely to locate photos that are of particular interest to them. For example, many users currently store their digital images in the hierarchical, directory-based file system structure that is native to personal computers. To find particular photos stored in such a hierarchical directory tree or structure, users must know the full pathname to the directory in which their photographs are stored.

There are other disadvantages to storing digital photographs in a hierarchical, directory-based file system. For example, cataloguing and storing groups of photos by categories such as vacation photos or wedding photos requires creating different directories for each of the desired categories. This further increases the amount of information that must be remembered in order to locate desired photos. In addition, in order to store photos in two or more overlapping categories, such as photos that include your favorite aunt and photos from your cousin's wedding, users must either store duplicate photographs, or master the concepts of directory trees and file pointers. While these are not difficult concepts for sophisticated computer users, they can be troublesome for less sophisticated users, thereby limiting the useful ways these users can store and retrieve digital photographs and photographic information.

SUMMARY

The present invention relates to methods and apparatus for storing, cataloguing, managing, organizing, finding and displaying objects such as digital images. The invention includes methods for associating ("tagging") fields of text and numeric data ("metadata") with individual objects such as images or photos, storing the objects and associated metadata as records in a relational database, and selecting, sorting, organizing and finding the objects based on their tagged metadata content.

Default metadata tags can be specified, and new metadata tags can be defined and created through a tag editor by naming the tag, selecting its tag type, optionally selecting a graphical icon that represents the tag, and filling in any remaining fields or attributes that are unique to and define the tag type. Tags can be readily associated with an object by adding a record containing the tag information or metadata to a database, and relating the tagged metadata record to a database record containing the object or a pointer to the object. Tags can also be graphically associated with an object by, for example, dragging and dropping a graphical icon representing the tag onto a graphical representation of the object. In the latter case, database records containing the tag metadata are automatically created and related to the database record containing the target object or a pointer to the target object.

Once objects have been tagged with metadata, they can be searched for according to one or more tagged search criteria. When the objects to be search for are photos, these search criteria can include, but are not limited to, the date and time the photos were taken, textual information that is associated with the photos such as the names of the people who are in the photos or the places or events where the photos were taken, designations of the photos as favorite photos, and designation of the photos as photos that have been printed, shared with others, or archived on a certain date.

When a database is searched for objects that match one or more tagged search criteria, the matching objects can be viewed or arranged according to the degree to which they have associated metadata that matches the search criteria. In particular, objects that match all of the search criteria can be displayed first, followed by objects that match one or more of the search criteria, and finally by objects that match none of the search criteria. Objects in the different match groups can be differentiated from one another in the display area by visual cues, such as being displayed in front of different background colors or patterns. Thus, objects matching all of the search criteria can be displayed in front of a white background, while objects matching some of the search criteria can be displayed in front of a blue background, and objects matching none of the search criteria can be displayed in front of a gray background.

The distribution of the objects stored in the database can be displayed as a histogram along a timeline. Time bands can be set along the timeline to indicate a time period that can be used to search for matching objects in the database, or to limit the search results for a given tag search to objects having temporal metadata within the indicated time period. When the timeline is used to limit the search results for a tag search, the timeline displays not only the temporal distribution of all objects in the database over the indicated time period, but also the temporal distribution of all objects in the database matching the specified tag search criteria over the indicated time period.

In addition to timelines, the temporal distribution of objects in the database can be represented in a calendar view such that the days of the calendar indicate the number of objects having metadata associated with a given day of the week in a given week of the month. The calendar view can also be used to limit the search results for a tag search, in which case the calendar view will indicate all of the days of the month associated with objects that match all of the tagged search criteria, match some of the tagged search criteria, and match none of the tagged search criteria.

The details of one or more embodiments of the invention are set forth in the accompanying drawings and the description below. Other objects, features, and advantages of the invention will be apparent from the description and drawings, and the claims.

BRIEF DESCRIPTION OF DRAWINGS

FIG. 4 illustrates a calendar view of the data in accordance with the present invention.

DETAILED DESCRIPTION

The present invention provides a method for users to organize and find digital images and photos by tagging them. Before being tagged, photos must be imported into a database where photographic metadata or information about the photos can be stored. While entire photos can be stored in the database, it is generally more efficient to store pointers to photos in the database rather than the photos themselves. Photos can be imported into the database from any of a number of devices or sources including, but not limited to, a digital camera, a flash memory device, a hard disk drive, a floppy drive, a CD-ROM, or a networked computer or file server. Once imported into the database, the photos can be tagged with one or more objects containing metadata that identifies the unique or important properties of the photo such as when or where the photo was taken, or who or what is the subject of the photo.

Figure 1:
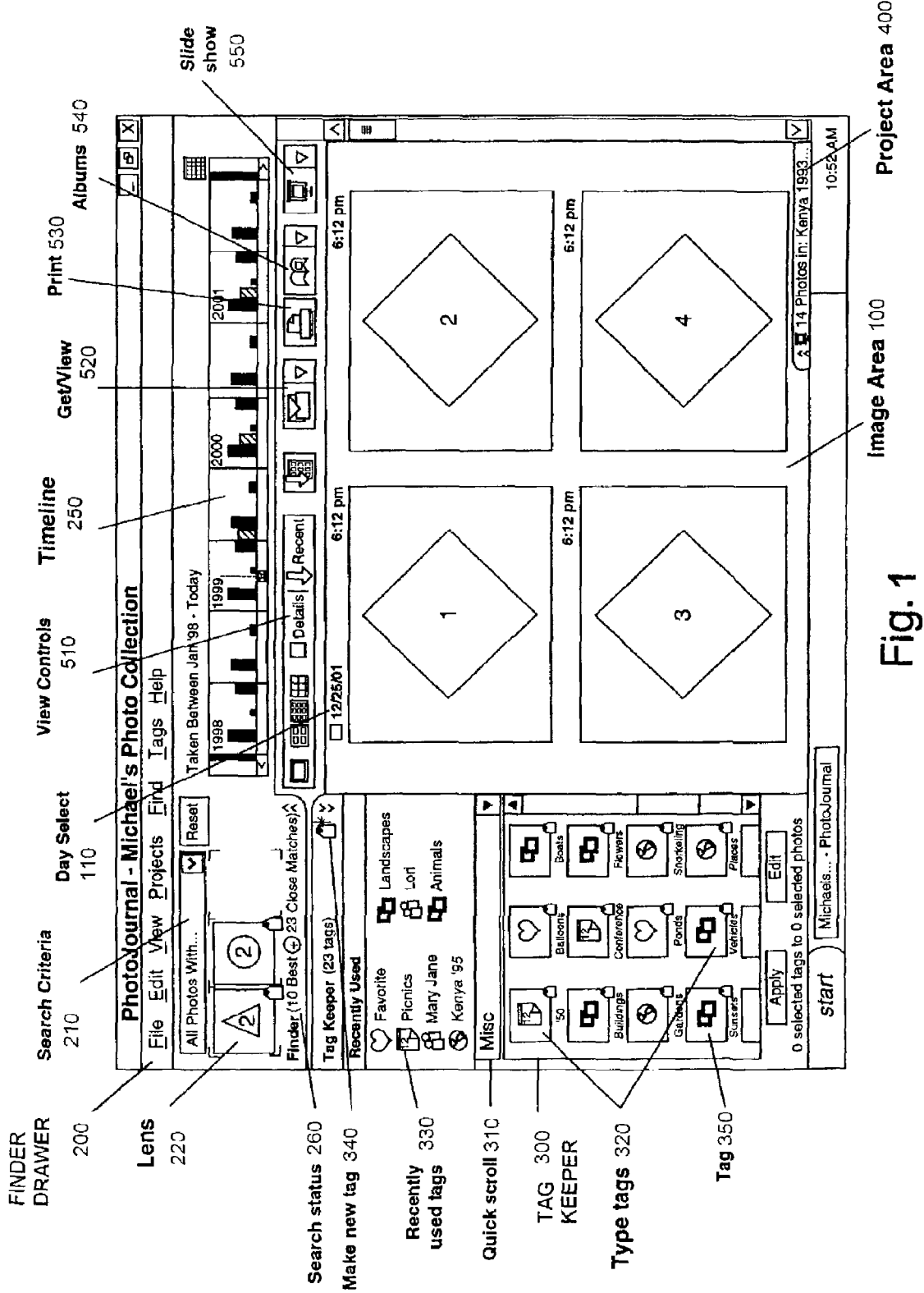
FIG. 1 illustrates one embodiment of a user interface for a computer program product in accordance with the present invention.

As shown in FIGS. 1, in one embodiment tags 350 can be applied to photos by dragging and dropping graphical icons representing the tags onto one or more photos 1-4 that are displayed in an image area 100. When a tag is dropped onto a photo, the database record that contains a pointer to the photo is updated to contain or point to metadata that is associated with the tag that has been dropped onto the photo. This metadata can include when the photo was taken, where it was taken, the nature of the event at which it was taken, the subject of the photo, and whether the user considers the photo one of his or her favorites. Once tagged, photos with specific tags or combinations of tags can be readily found in the database by searching the database for all records that contain the same metadata as the metadata that is associated with the one or more search tags.

Tags, and the metadata they contain, can be created and modified in a tag editor. The tag editor allows a user to specify a tag name and tag type, and to enter metadata in the form of tag attributes that can be stored in tags of the specified tag type. For convenience, tags can be divided into one or more tag categories. For example, in one embodiment tags are divided into people, events, places and miscellaneous tag categories. Tags in the different tag categories generally have different tag attributes to distinguish between themselves and tags in other tag categories. In general, a tag's attributes do not need to be filled in to associate a tag with a photo. The tag itself is a form of metadata that can be associated with the photo, regardless of whether the tag's possible attributes are also associated with the photo. However, when a tag's attributes are completely or partially filled in, more metadata is associated with the tagged photo, thereby making the photo easier to search for and find.

The people tag category includes default tag types for family and friends, and can be customized to include other groups of people such as business associates, classmates, co-workers, and neighbors, and particular individuals such as a spouse, daughter, or friend. Tags in the people category can contain attributes such as a person's name, sex, birthdate, anniversary, postal and/or email address(es), phone number(s), a sharing profile specifying which if any pictures can be shared with the people associated with the tag, and the relationships between the people associated with the tag and other tagged individuals.

The events tag category includes default tag types for parties and vacations, and can be customized to include tag types for particular types of events such as concerts, plays, shows and sporting events, and for particular events such as the 2002 Boston Marathon. In addition, tags in the events category can include pre-defined calendar events such as New Years Eve, and customized calendar events such as birthdays and anniversaries. Tags in the event tag category can contain attributes corresponding to the names, locations, and dates of the underlying events associated with the tags.

The places tag category can be customized to include tag types for particular places such as a home, an office, an art museum, or a vacation destination. Tags in the places tag category can contain attributes corresponding to specific locations that are associated with photos, including the name of the location (e.g., The Metropolitan Opera House), the names of the city, state, country and region of the world in which the photos were taken or which are the subject of the photos, and the geographical coordinates (e.g., longitude and latitude) for those places.

Finally, the miscellaneous tag category is as a customizable catchall for tags that cannot be easily grouped into a meaningful global category with other tags. Examples of miscellaneous tag types include tags for an apartment or home search, tags for artistic or photos, and tags for particular cars or types of cars. Miscellaneous tags can contain attributes corresponding to the name of the subject of the photo, and where and when the photo was taken.

Figure 2:
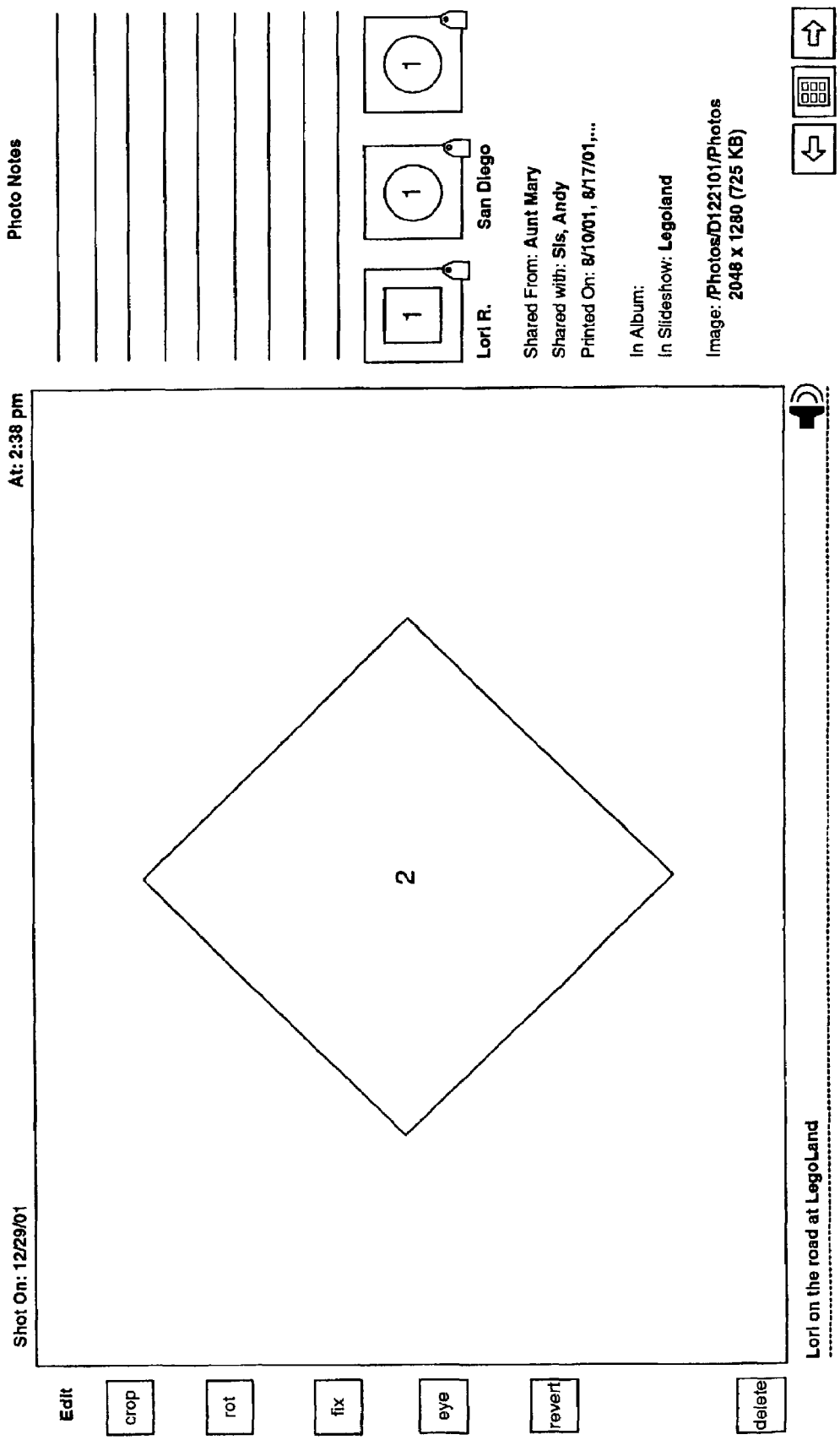
FIG. 2 illustrates an image displayed with its associated metadata, including its tags, in accordance with the present invention.

As shown in FIG. 2, the metadata that is associated with a photo can be viewed and edited directly by displaying the photo together with its associated metadata. FIG. 2 shows a photo entitled "Lori on the road at Legoland" associated with a customized people tag, Lori R., and a customized places tag, San Diego. The tags and title indicate this is a photo of Lori R. taken on a trip to Legoland in San Diego, Calif. This photo can be retrieved from the database in any number of different ways, together with different photos that are related to this photo in different ways, as discussed below.

In general, photos in the database that have been tagged with one or more tags can be searched for and sorted by querying the database for all photos having tags that match one or more search tags or the metadata contained within the one or more search tags. These metadata can include, but are not limited to, data indicating whether photos are favorites; frequently viewed; similar to currently selected photos; untagged; taken on a particular day or recurring event; shared with or received from certain people; imported from certain places; and printed or exported on certain dates. In addition, the metadata can include the subject of the photo, whether a person, place, or event; as well as the place and/or event at which the photo was taken. For example, the photo of Lori R. in Legoland can be retrieved from the database by querying the database for all photos tagged with a Lori R. tag. This search will pull up all photos of Lori R., including the Legoland photo, regardless of where the photos were taken. Alternatively, the Legoland photo can be retrieved by searching the database for all photos tagged with a San Diego tag. This search will pull up all photos taken in or of San Diego, including the Legoland photo, regardless of who is in the photo. Finally, the Legoland photo can be retrieved by searching the database for all photos tagged with both a Lori R. tag and a San Diego tag. This search will pull up all photos taken in or of San Diego that include Lori R, including the Legoland photo.

The database search for photos that match certain tags or groups of tags can be graphically constructed by dragging various icons representative of tags 350 into a graphical query builder or lens 220, and searching the database for records with matching tags or metadata. When search criteria are applied to the photos in the database, the order in which the photos are displayed is updated so that "best match" photos or photos that match all of the search criteria are displayed at the top of an image area 100 in front of a first background color or pattern, while "close match" photos that match one or more but not all of the search criteria are displayed after the "best match" photos and are visually distinguished from them by, for example, being displayed in front of a second background color or pattern, and "no match" photos that fail to match any of the search criteria are displayed at the bottom of the image area in front of a third background color or pattern.

Perhaps the easiest search to conduct on tagged photos is a search for photos taken on a certain date, or within a certain period of time. As previously mentioned, among the metadata that can be stored with a photo is information indicating the date and time a photo was taken. This information is often automatically associated with a photo when the photo is created or when the photo is scanned into a digital scanner. If the photo is created on a digital camera, the camera will generally tag the photo with the date and time the photo was taken. If the photo is scanned into a digital scanner, the scanner will generally tag the photo with the date and time it was scanned. If for any reasons neither the digital camera nor digital scanner tags the photo with the date and time information, the database will tag the photo with the information when it is first imported.

Figure 3:
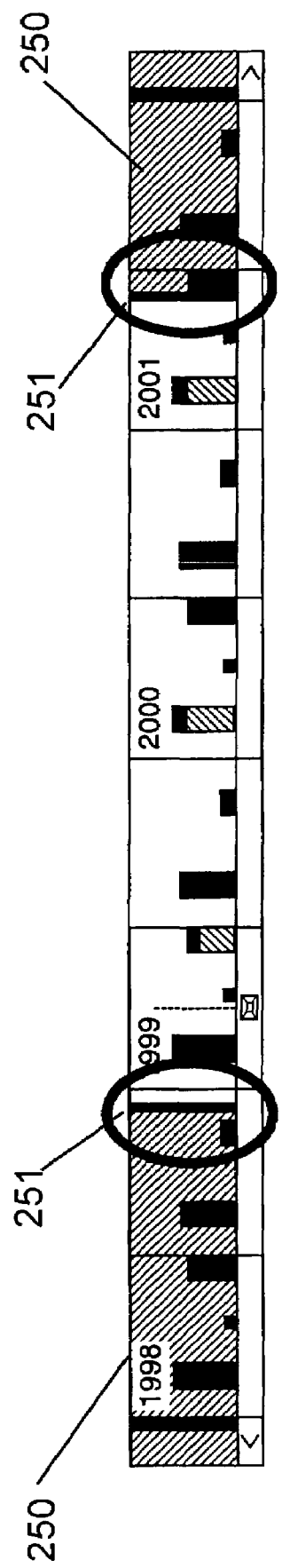
FIG. 3 illustrates a timeline view of the data in accordance with the present invention.

As shown in FIG. 3, when photos are imported into a database, the temporal metadata associated with the photos can be used to present a histogram of photos in the form of a timeline 250 as shown in FIG. 1. The timeline 250 can show the number of photos taken as a function of time over some period of time that can range from the time the first photo in the database was taken to the present. The timeline 250 can be used by itself, or with other tags 350 to specify the criteria used to search for matching photos. The timeline includes adjustable time bands 251 that can be moved to allow timeline 250 to specify the time period that is used to find matching photos.

When the timeline 250 is used by itself to search for matching photos, the adjustable time bands 251 can be moved to find all photos in the database that are tagged with a date or timestamp that falls within the range indicated by the adjustable time bands 251. Photos falling within this range are designated "best match" photos, and can be viewed as such in image area 100. For example, the timeline 250 can be used by itself to find all photos taken between Jan. 1, 2000 and Feb. 28, 2000 by moving the adjustable time bands 251 to these two respective dates. The photos the database that have been tagged with a timestamp falling between these two dates can be retrieved from the database, and displayed in the "best match" section of image area 100.

In addition to finding photos according to their timestamp, the timeline 250 can be used with other metadata to limit search tag results. For example, if the adjustable time bands 251 of timeline 250 indicate the period of interest extends from Jan. 1, 2000 to Feb. 28, 2000, searching the database for all photos having a San Diego tag will return the photo "Lori on the road at Legoland" as a "best match" photo, and display the photo in image area 100, only if the photo was taken sometime between Jan. 1, 2000 and Feb. 28, 2000. If the photo was taken outside of this time period, it would only appear as a "close match" photo in image area 100. When tag searches are conducted in conjunction with timeline 250, the timeline displays the total number of photos in the database per unit time period in a first color which may be a solid color, and the total number of photos in the database that match the tagged search criteria as "best" or "close" matches in a second color which may be a hatched pattern or color.

In one embodiment, the timeline 250 shown in FIG. 3 does not display the exact number of photos taken during a given period of time, but rather displays a vertical bar graph with bar heights that are representative of the number of photos taken during a given period of time normalized to the average number of photos taken during all such similar periods of time in the database. For example, for a given period of time, the displayed vertical bar can have a height of 0 when no photos have been taken during that period; 1 when one to five photos have been taken during that period; 2 when the normalized number of photos taken during that period was up to 50% of the average number of photos taken during all time periods; 3 when the normalized number of photos taken during that period was between 50% and 80% of the average number of photos taken during all time periods; 4 when the normalized number of photos taken during that period was between 80% and 120% of the average number of photos taken during all time periods; 5 when the normalized number of photos taken during that period was between 120% and 150% of the average number of photos taken during all time periods; 6 when the normalized number of photos taken during that period was between 150% and 200% of the average number of photos taken during all time periods; and 7 when the normalized number of photos taken during that period was more than 200% of the average number of photos taken during all time periods.

As shown in FIG. 4, in addition to timeline 250, photos taken on a particular day or during a particular month can also be found by displaying the photos in a 2-D histogram or scatter plot such as the calendar view shown in the figure. The calendar view displays all of the photos that have been taken, scanned, or imported into the database on any day in a given month as a function of the day of the week the photos were taken, and the week in the month. If a particular day of the month is selected in the calendar view, all photos taken on that day can be retrieved from the database as "best match" photos. For example, FIG. 4 shows that during the month of June, 2001 two sets of photos were taken. The first set contains a single photo taken on June 8, while the second set contains 10 photos taken on June 18. By selecting the June 18 calendar day, the 10 photos taken on June 18 are selected as the "best match" photos, and can be displayed in image area 100.

The calendar view can also display the results of a tag search in the month-at-a-glance mode. When so used, each day in the calendar can indicate not only whether any photos were taken on that day, but whether the photos taken on that day fall into the "best match", "close match", or "no match" group with respect to the tagged search criteria. For example, if the Legoland photo described in FIG. 2 was one of ten photos of Lori R. taken in San Diego on Jun. 18, 2001, and a search were done for all photos having a San Diego tag, then the Jun. 18, 2001 square in FIG. 4 would indicate that day as having photos in the "best match" group. If, however, a search were done for all photos having a New York tag, the Jun. 18, 2001 square in FIG. 4 would indicate that day as having photos in the "no match" group. Finally, if a search were done for all photos having a New York tag and a Lori R. tag, the Jun. 18, 2001 square in FIG. 4 would indicate that day as having photos in the "close match" group.

The particular group into which a set of photos taken on a given calendar day falls can be indicated on the calendar using the same color based indication scheme used to indicate matching photo groups that are displayed in the viewing area. Thus, calendar days containing one or more photos in the "best match" group can be presented as white squares, while calendar days containing one or more photos in the "close match" group and no photos in the "best match" group can be presented as blue squares, and calendar days containing no photos in either the "best match" or "close match" groups can be presented as gray squares.

Figure 5:
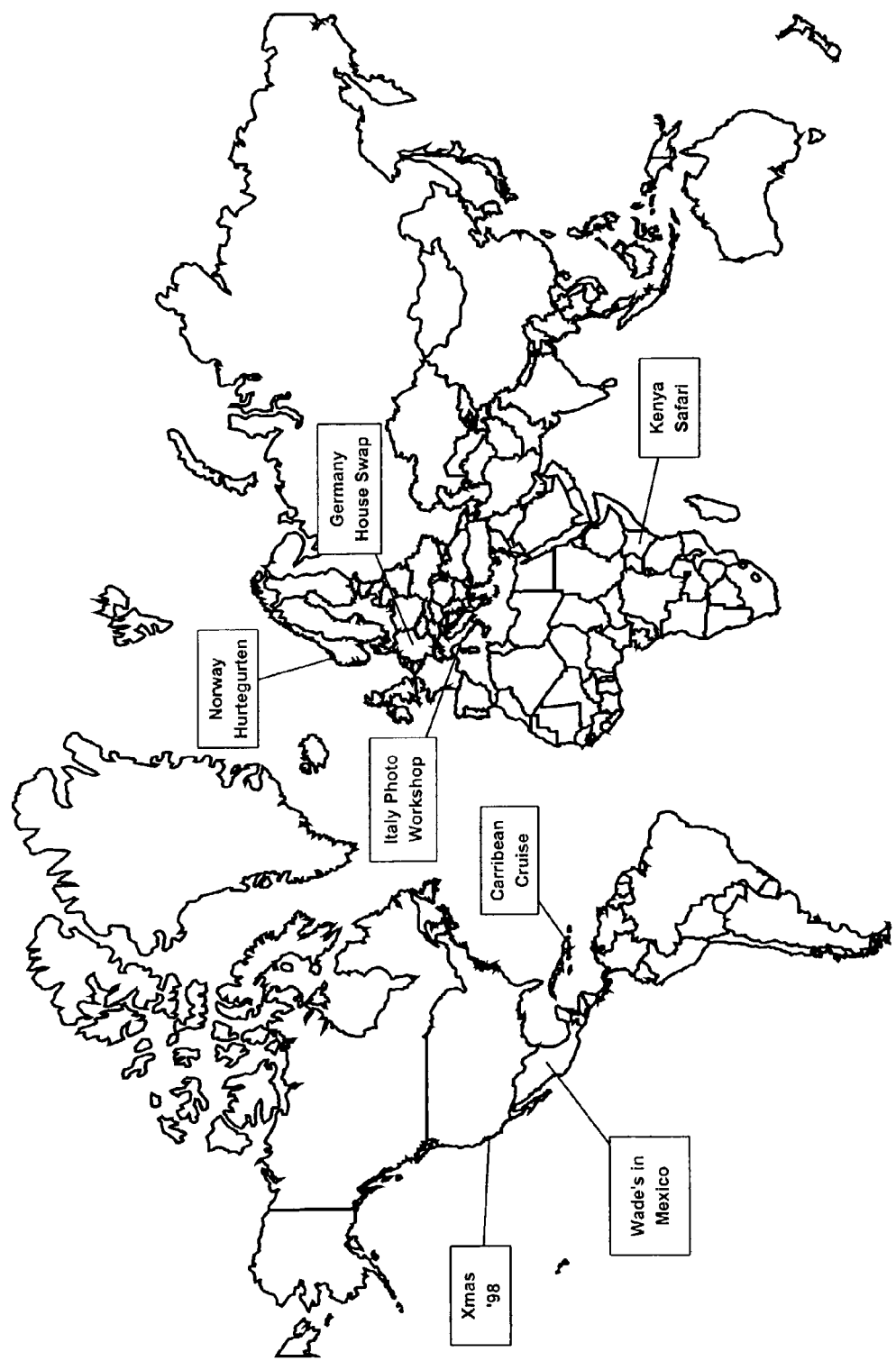
FIG. 5 illustrates a map view of the data in accordance with the present invention.

As shown in FIG. 5, in addition to the timeline 250 and calendar views, data can be searched for and displayed in an alternate 2-D histogram or scatter plot such as a map view. In the map view, the place tag metadata is used to display the geographic distribution of photos in the database. Like the timeline 250 and calendar views, the map view can be used to search for photos either by itself, or in conjunction with one or more tag searches. If the map view is used by itself to search for photos, icons representing the places where photos in the database have been taken are displayed on a map such as the world map shown in FIG. 5. When a location on the map is selected, photos taken in that location can be retrieved from the database as photos in the "best match" group. For example, if the location of Kenya on the map in FIG. 5 is selected, photos taken in Kenya can be selected from the database, and can be displayed in image area 100 as "best match" photos.

The map view can also be used in conjunction with a tag search. When so used, the map view will display not only the distribution of photos as a function of geographic location, but whether the photos taken at the various geographic locations fall in the "best match", "close match", or "no match" group with respect to the tagged search criteria. For example, if a search for all photos having an African tag were displayed in the map view, the map view would indicate that photos taken from the Kenya Safari fall into the "best match" group, while all of the other photos shown in FIG. 5 fall into the "no match" group. As with the calendar and timeline 250 views, the particular group into which a set of photos taken from a given location falls can be indicated on the map using the same color based indication scheme used to indicate matching photo groups that are displayed in image area 100. Thus, locations containing one or more photos in the "best match" group can be presented as a white area, while locations containing one or more photos in the "close match" group and no photos in the "best match" group can be presented as a blue area, and locations containing no photos in either the "best match" or "close match" groups can be presented as a gray area.

The map view can be varied in size and shape to accommodate the geographic extent of the photos that are either in the database or that are responsive to a tag search conducted on the photos in the database. Thus, if a map view is used to display or further search among database photos having a North American tag, the map view can be limited to a view of the North American continent. The map view can also be varied in size and shape by selecting particular regions of a map, such as the western region of the United States, or by zooming in and out of the currently displayed map region. Photos corresponding to particular locations within a map view, like San Diego, can be geographically found directly from the map view.

Once photos matching a given set of tags are found, they can be selected as a group, and various photo management functions such as printing, sharing, or exporting the photos to a slide show or to a photo album can be performed on the group. As a default, all photos in the "best match" group are selected when selecting photos that match a given set of tag search criteria. However, the default can be changed such that all photos in both the "close match" and "best match" groups are selected when selecting photos that match a given set of tag search criteria.

It should be noted that while the invention has been described in terms of managing, cataloguing, searching, and finding digital images and photographs, the invention can equally be used to manage, catalogue, search for and find other types of digital media such as video files, audio files, photo slide shows, and photo albums. These different types of media can be distinguished from one another with a tag of tag type media. The media tag, when applied to a media object, can graphically indicate the type of media object that is stored in the database.

Figure 6:
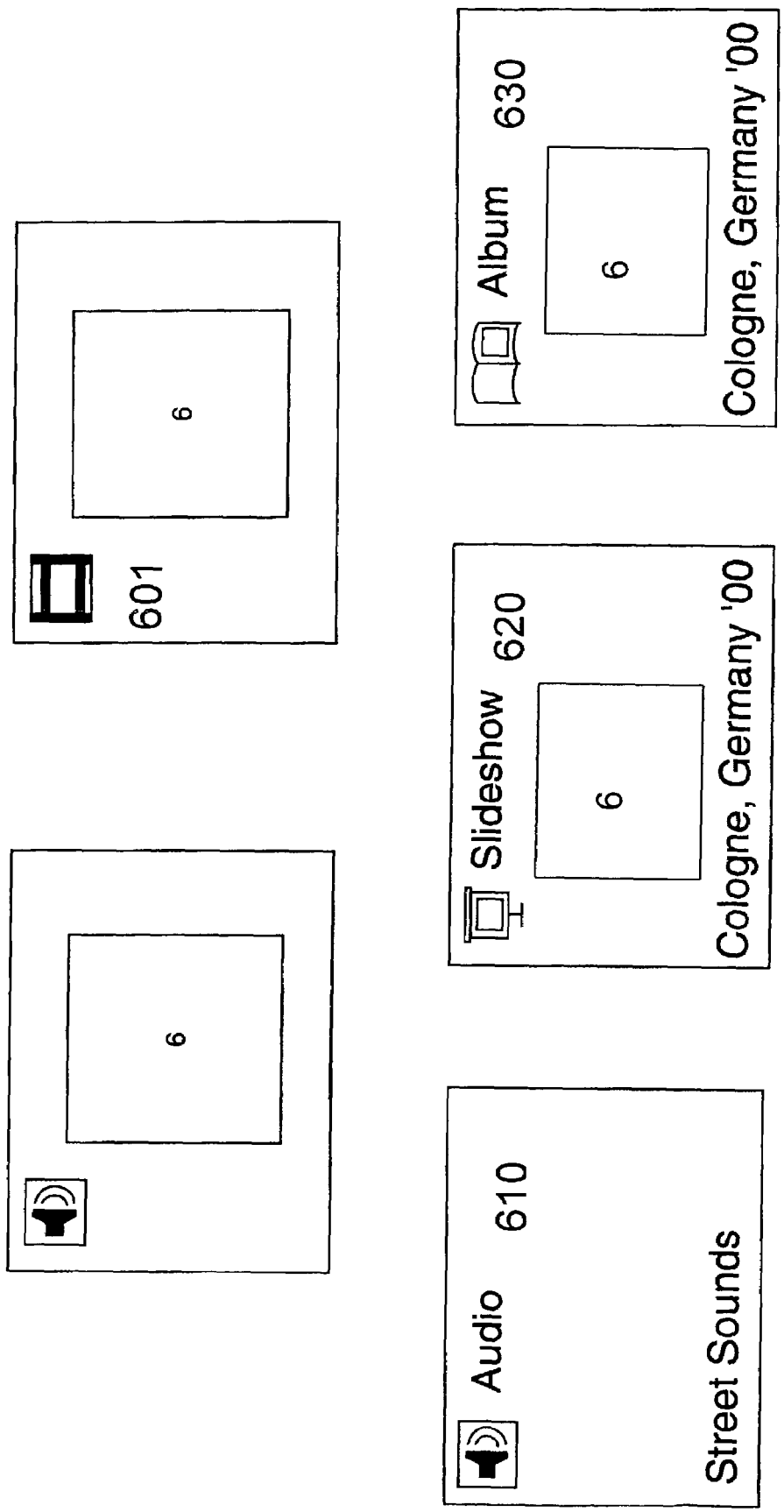
FIG. 6 illustrates the display of different media types that are stored in accordance with the present invention.

As shown in FIG. 6, a video file 600 can be stored in the database and identified by displaying its first frame together with an overlaid video file icon. Similarly, an audio file 610 can be stored in the database and identified by displaying the title of the audio file together with an audio file icon. Audio files can be associated with and stored as a component part of a slide show or photo album, and can be played as a soundtrack whenever the slide show or photo album is viewed. Slide shows such as slide show 620, and photo albums such as photo album 630 can also be stored in the database, and iconically identified as shown FIG. 6. Each of these objects can be tagged, searched for, and manipulated using the same tools that are used to tag, search for, and manipulate digital photos, as previously discussed.

While the invention has been described as a computer program or algorithm, the invention can be implemented in digital electronic circuitry, or in computer hardware, firmware, software, or in any combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors can include both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, application-specific integrated circuits (ASICs).

While the invention has been described in terms of particular embodiments, it should be understood that other embodiments are possible as would be apparent to one of ordinary skill in the art. Accordingly, these and other embodiments are within the scope of the following claims.

What is claimed is:

1. A method comprising:
   receiving a first input indicating that a user has dragged and dropped an icon representing a first metadata tag onto a graphical representation of a first digital media object, the first metadata tag having associated first metadata, the first digital media object being one of a plurality of digital media objects;
   retrieving, in response to the first input, the first metadata associated with the first metadata tag;
   identifying, in a database, a first database record that is associated with the first digital media object and updating the first database record to include the retrieved first metadata, the database comprising a plurality of records, each associated with a respective one of the plurality of digital media objects;
   receiving a second input indicating that the user has dragged and dropped the icon onto a graphic representation of a search function for the database;
   querying the database for digital media objects associated with metadata that matches the first metadata associated with the first metadata tag represented by the icon; and
   displaying a representation of the digital media objects that are responsive to the database query.

2. The method of claim 1, wherein the objects responsive to the database query are displayed as a histogram.

3. The method of claim 2, wherein the histogram is a timeline.

4. The method of claim 3, wherein the timeline represents the number of photos taken during a given period of time normalized to an average number of photos taken during similar time periods.

5. The method of claim 2, wherein the histogram is a map.

6. The method of claim 2, wherein the histogram is a calendar.

7. The method of claim 1, wherein the objects responsive to the database query are displayed as a scatter plot.

8. The method of claim 7, wherein the scatter plot is a calendar.

9. The method of claim 7, wherein the scatter plot is a map.

10. The method of claim 1, wherein the digital media object is a digital photograph, a video file, an audio file, a photo slide show or a photo album.

11. A computer program product, tangibly embodied in a machine readable storage device, the computer program product comprising instructions operable to cause a programmable processor to:
    receive a first input indicating that a user has dragged and dropped an icon representing a first metadata tag onto a graphical representation of a first digital media object, the first metadata tag having associated first metadata, the first digital media object being one of a plurality of digital media objects;
    retrieve, in response to the first input, the first metadata associated with the first metadata tag;
    identify, in a database, a first database record that is associated with the first digital media object and updating the first database record to include the retrieved first metadata, the database comprising a plurality of records, each associated with a respective one of the plurality of digital media objects;
    receive a second input indicating that the user has dragged and dropped the icon onto a graphic representation of a search function for the database;
    query the database for digital media objects associated with metadata that matches the first metadata associated with the first metadata tag represented by the icon; and
    display a representation of the digital media objects that are responsive to the database query.

12. The computer program product of claim 11, wherein the objects responsive to the database query are displayed as a histogram.

13. The computer program product of claim 12, wherein the histogram is a timeline.

14. The computer program product of claim 13, wherein the timeline represents the number of photos taken during a given period of time normalized to an average number of photos taken during similar time periods.

15. The computer program product of claim 12, wherein the histogram is a map.

16. The computer program product of claim 12, wherein the histogram is a calendar.

17. The computer program product of claim 11, wherein the objects responsive to the database query are displayed as a scatter plot.

18. The computer program product of claim 17, wherein the scatter plot is a calendar.

19. The computer program product of claim 17, wherein the scatter plot is a map.

20. The computer program product of claim 11, wherein the digital media object is a digital photograph, a video file, an audio file, a photo slide show or a photo album.

21. A system comprising a computer having a memory containing instructions that when executed cause the computer to perform operations comprising:
    receiving a first input indicating that a user has dragged and dropped an icon representing a first metadata tag onto a graphical representation of a first digital media object, the first metadata tag having associated first metadata, the first digital media object being one of a plurality of digital media objects;
    retrieving, in response to the first input, the first metadata associated with the first metadata tag;
    identifying, in a database, a first database record that is associated with the first digital media object and updating the first database record to include the retrieved first metadata, the database comprising a plurality of records, each associated with a respective one of the plurality of digital media objects;
    receiving a second input indicating that the user has dragged and dropped the icon onto a graphic representation of a search function for the database;
    querying the database for digital media objects associated with metadata that matches the first metadata associated with the first metadata tag represented by the icon; and
    displaying a representation of the digital media objects that are responsive to the database query.

22. The system of claim 21, wherein the objects responsive to the database query are displayed as a histogram.

23. The system of claim 22, wherein the histogram is a timeline.

24. The system of claim 23, wherein the timeline represents the number of photos taken during a given period of time normalized to an average number of photos taken during similar time periods.

25. The system of claim 22, wherein the histogram is a map.

26. The system of claim 22, wherein the histogram is a calendar.

27. The system of claim 21, wherein the objects responsive to the database query are displayed as a scatter plot.

28. The system of claim 27, wherein the scatter plot is a calendar.

29. The system of claim 27, wherein the scatter plot is a map.

30. The system of claim 21, wherein the digital media object is a digital photograph, a video file, an audio file, a photo slide show or a photo album.

* * * * *

UNITED STATES PATENT AND TRADEMARK OFFICE
CERTIFICATE OF CORRECTION

PATENT NO. : 7,415,662 B2  Page 1 of 1
APPLICATION NO. : 10/198618
DATED : August 19, 2008
INVENTOR(S) : Kenneth Rothmuller et al.

It is certified that error appears in the above-identified patent and that said Letters Patent is hereby corrected as shown below:

Title page - Related U.S. Application Data
left-hand column, line 25:
insert --(63) Continuation of 10/052,213, filed January 16, 2002 (ABN), which is a continuation in part of 09/774,523, filed January 31, 2001 (ABN)--

Title page - Related U.S. Application Data
left-hand column, line 25:
delete "(60) Provisional application No. 60/334,516, filed on Oct. 31, 2001", and replace with --(60) Provisional application No. 60/261,897, filed January 16, 2001, provisional application No. 60/179,379, filed January 31, 2000, and provisional application No. 60/334,516, filed on Oct. 31, 2001--

Signed and Sealed this

Third Day of March, 2009

JOHN DOLL
*Acting Director of the United States Patent and Trademark Office*